May 12, 1942.　　　E. F. HUBACKER　　　2,282,586
ELECTRIC MOTOR UNIT OR THE LIKE
Filed April 4, 1939　　　2 Sheets-Sheet 1
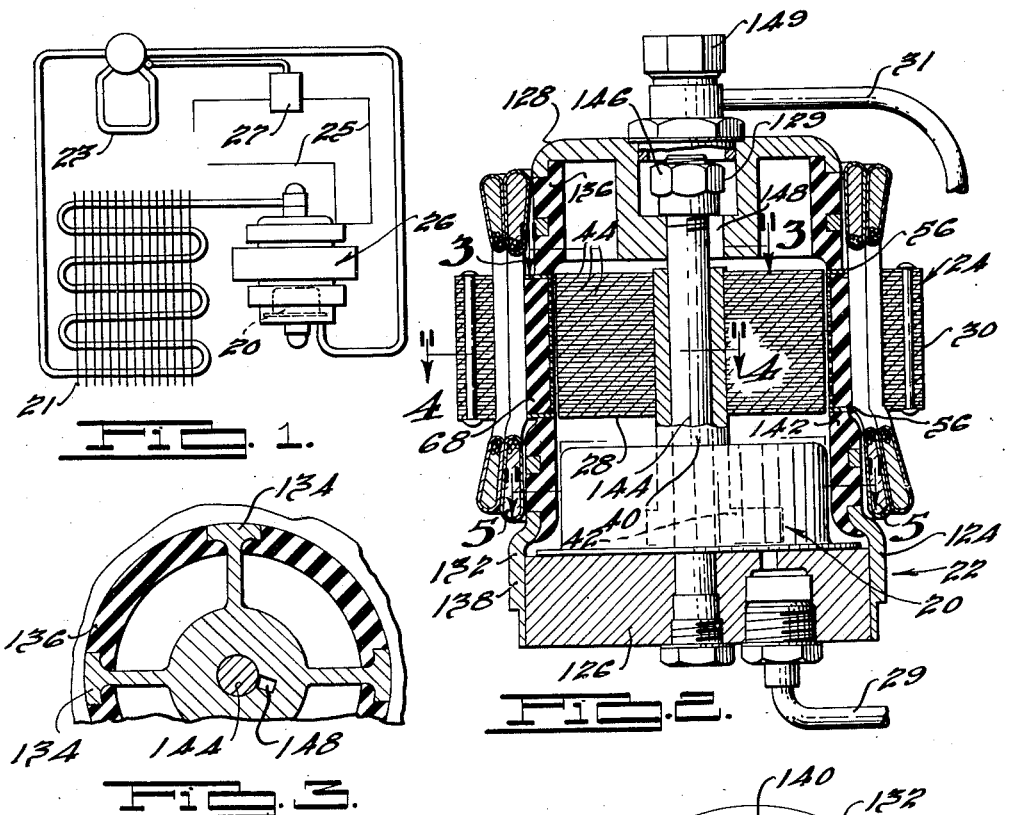
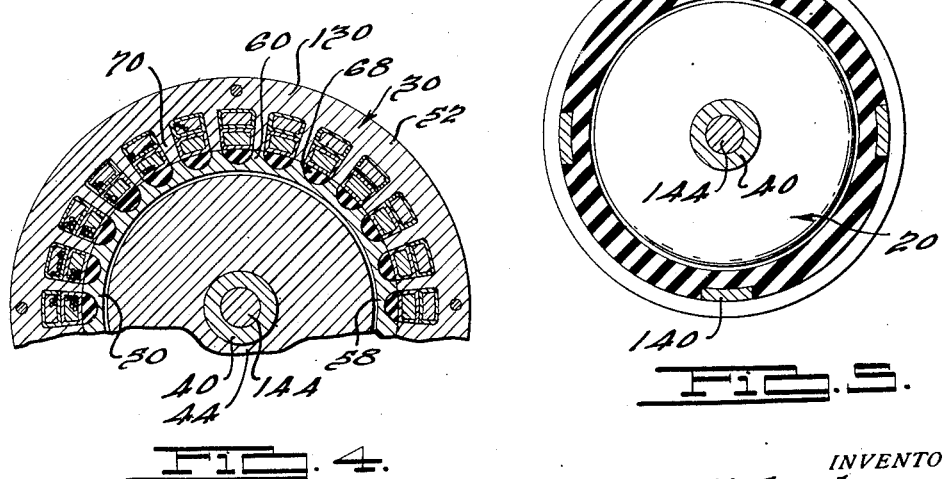
INVENTOR
Earl F. Hubacker.
BY
ATTORNEY May 12, 1942.   E. F. HUBACKER   2,282,586
ELECTRIC MOTOR UNIT OR THE LIKE
Filed April 4, 1939   2 Sheets-Sheet 2
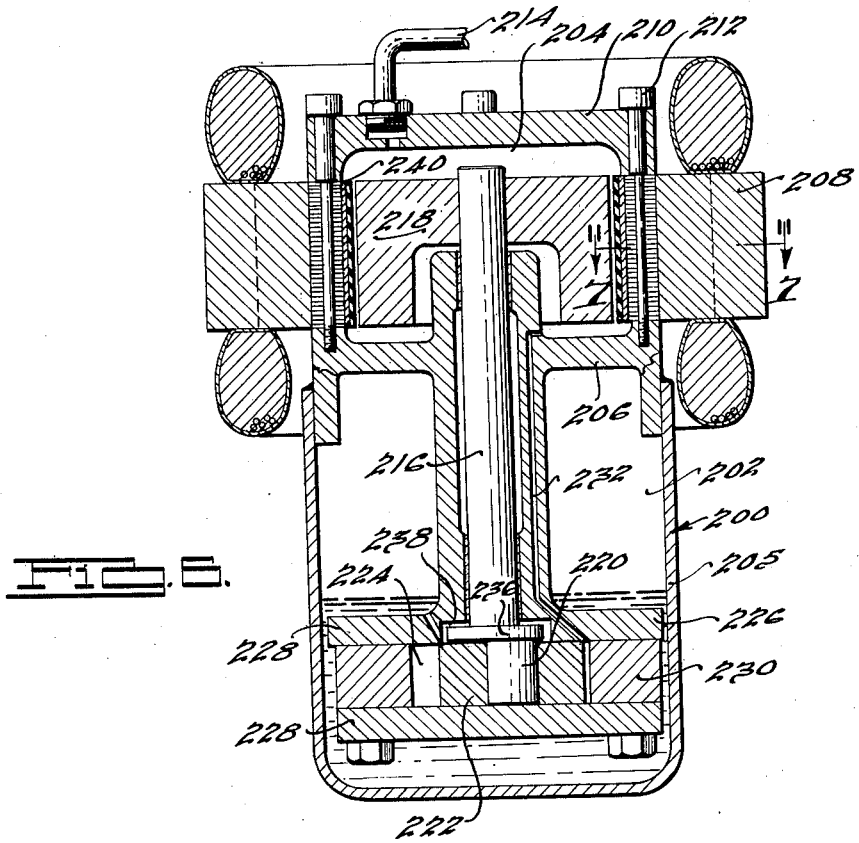
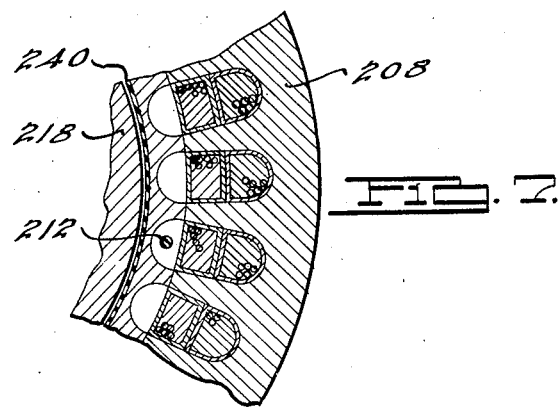
INVENTOR
Earl F. Hubacker.
BY
ATTORNEY Patented May 12, 1942

2,282,586

UNITED STATES PATENT OFFICE 2,282,586

ELECTRIC MOTOR UNIT OR THE LIKE

Earl F. Hubacker, Highland Park, Mich., assignor to Borg-Warner Corporation, Chicago, Ill., a corporation of Illinois Application April 4, 1939, Serial No. 265,965

5 Claims. (Cl. 172—36)

This invention relates to electric motors, and particularly to electric motors for use in refrigerating systems wherein the motor rotor is arranged within a sealed casing, with the motor windings arranged externally thereof.

In refrigerating systems utilizing a compressor or pump, and wherein the pump or compressor is driven by a motor through a seal, difficulty has been encountered in preventing loss of the refrigerant medium employed in the system through such seals. Heretofore various arrangements of "sealed units" have been suggested. In one type of "sealed unit" heretofore employed, an electric motor and a compressor or pump, have been enclosed in a gas-tight casing so that no seal was required. Some of the disadvantages of this type of construction are that the motor windings are exposed to the refrigerating medium within the casing and also that the electrical conduits have to be brought through the walls of a metallic casing in such a way as to be insulated therefrom and not to permit the escape of the refrigerating medium. Another type of sealed motor compressor construction has been suggested wherein a gas-tight casing is interposed between the stator and the rotor of the motor. A still further modification of a sealed motor compressor construction has been suggested wherein the stator laminations were formed as a part of a gas-tight casing enclosing the motor rotor and the compressor and with the motor windings arranged externally of the casing. While these latter two constructions did obviate certain disadvantages of the sealed motor construction unit wherein the windings were enclosed within the gas-tight casing, these latter two constructions did present other problems and difficulties, particularly in that the motor was inefficient on account of the large flux losses due, primarily, to the amount of metal or the distance between the motor windings and the motor rotor.

This invention contemplates the provision of a sealed casing having a motor rotor and a compressor arranged therein and with the motor windings arranged externally of the casing. More particularly the invention contemplates an improvement in sealed motor compressor units wherein the flux losses and consequent inefficiency of the constructions heretofore suggested are eliminated and this result is obtained in the present instance by means of an improved form and method of constructing and arranging the gas-tight casing and the motor windings.

A principal object of the invention therefore, is the provision of a sealed motor compressor unit wherein the motor windings are arranged on the outside of the unit and which unit is more efficient in operation than those heretofore known.

Another object of the invention is to provide a new and improved form of sealed motor compressor unit which is adapted to be economically manufactured, and which is so designed as to permit the manufacture and assembly thereof, in accordance with present day large scale methods of construction and assembly.

Another object of the invention is to provide an improved form of sealed motor compressor unit wherein a plastic or non-conducting material is employed as a part of the gas-tight casing which encloses the motor rotor and compressor.

Another object of the invention is to provide a sealed motor compressor unit wherein the motor windings are arranged externally thereof, with a gas-tight ring arranged between the motor windings and the motor rotor, which ring is so constructed and arranged as to form a part of the casing enclosing the compressor and the rotor and able to withstand the pressures prevailing within the casing, and which ring is designed so as to afford a minimum separation of the windings and the rotor so as to cut down the flux loss to a negligible quantity so that the motor is just as efficient as standard motors of the unsealed type now employed for driving the compressors of refrigerating systems.

Another object of the invention is to provide a sealed motor compressor unit of the type herein contemplated wherein the motor rotor is arranged in a chamber on the suction side of the compressor and wherein the motor stator forms a part of the walls of the chamber in which said motor rotor is arranged.

Another object of the invention is to provide a new and improved construction of electric motor and compressor unit.

Other objects and advantages of the invention will be apparent from a consideration of the following specification taken in conjunction with the accompanying drawings of which there are two (2) sheets and wherein:

Fig. 1 is a diagrammatic illustration of a refrigerating system embodying my invention;

Fig. 2 is a vertical sectional view of the motor compressor unit illustrated in Fig. 1, with the compressor being shown in elevation;

Fig. 3 is a horizontal sectional view taken in a plane along the line 3—3 of Fig. 2 looking in the direction of the arrows;

Fig. 4 is a horizontal sectional view through a part of the motor and taken in a plane along the line 4—4 of Fig. 2 looking in the direction of the arrows;

Fig. 5 is a horizontal sectional view taken in a plane along the line 5—5 of Fig. 2 looking in the direction of the arrows;

Fig. 6 is a vertical sectional view illustrating a modified form of construction of the motor compressor unit; and Fig. 7 is a sectional view taken in a plane along the line 7—7 of Fig. 6 looking in the direction of the arrows.

In Fig. 2 of the drawings there is illustrated, in vertical section, a sealed motor compressor unit which includes a refrigerant compressor or pump indicated generally at 20. This compressor may comprise a part of a refrigerating system of the compressor-condenser-expander type, such as is illustrated in Fig. 1, and wherein refrigerant is circulated by means of the compressor or pump 20 through a condenser 21 for extracting or dissipating heat from the refrigerant medium and thence to a freezer or evaporator 23 in which the refrigerant medium is expanded or vaporized for absorbing heat and the refrigerant medium is returned to the compressor from whence the cycle is repeated.

The compressor 20, as illustrated in the drawings, is shown as being enclosed within a gas-tight housing or casing indicated generally at 22 and an electric motor indicated generally at 24 is illustrated as being constructed integrally with the casing 22 and for operating the compressor. The motor 24 preferably is of the alternating current type and is adapted to be supplied with electric energy through suitable conduits 25 operatively connected to the motor windings indicated generally at 26 and which are arranged externally of the casing 22 and in such a manner as to permit the circulation of air thereover. Current may be supplied intermittently to the motor for operating the same at intermittent periods and the supply of current to the motor may be under the control of a switch 27 which is operatively associated with the evaporator or freezer element 23 of the refrigerating system so that the compressor may be operated in such a way as to maintain the temperature thereof and of the heat insulated compartment within which such evaporator may be arranged within said predetermined temperature limits. While the motor compressor unit herein contemplated is particularly suited for use in refrigerating systems, and especially refrigerating systems for household refrigerators, the motor compressor unit is adapted for use generally wherever it is desired to seal or protect the motor windings from conditions obtaining in the field of activity with which the motor may be used.

In the construction illustrated in Figs. 2 to 5, the compressor 20 is arranged within the gas-tight casing 22 and vaporous refrigerant from the evaporator is supplied to the intake side of the compressor 20 through suction line 29. The refrigerant is discharged from the compressor 20 into the interior of the casing 22 and the refrigerant is conducted from the casing 22 by means of conduit 31 to the condenser 21. The casing 22 functions as a lubricant reservoir and the lubricant therein, which preferably stands to a level just above the top of the compressor 20 is subjected to the discharge pressure thereof. As the refrigerant medium is supplied to the evaporator element 23 under the control of a suitable refrigerant expansion control, such as a low side float, the space within the casing 22 and the condenser 21 constitute the high pressure side of the refrigerating system.

A lubricant is provided for lubricating the working parts of the system such as the moving parts of the compressor 20 and the motor, and some of this lubricant will circulate with the refrigerant throughout the system; however, a body of lubricant will collect within the lower part of the casing 22 and to such an extent as to submerge the compressor 20 therein. As the lubricant in the casing is subjected to the discharge pressure of the compressor and as the compressor is submerged in lubricant, the working parts of the compressor will be lubricated and sealed. The details of the compressor are not illustrated in connection with this figure but the compressor may be of the rotary type, such as that disclosed in the patent to John C. Buchanan, No. 2,028,824, issued January 28, 1936, for Compressor for refrigerating systems, and the lubrication of the pump or compressor may be effected as disclosed in such patent; that is, by arranging the compressor within a body of lubricant and subjecting such lubricant to the discharge pressure of the compressor.

The motor 24 includes a rotor 28 and a stator 30 including the motor windings 26. The casing 22 comprises a cup-shaped shell 124 and a bearing block 126 fitted into the mouth of the shell and welded or otherwise suitably secured thereto. The cup-shaped shell 124 comprises a metallic end section 128, a stator section 130 and a cylindrical section 132. The end section 128 may comprise a generally circular end plate provided with a series of axially extending legs 134 and includes an annular wall 136 of plastic material, the legs 134 being embodied in the wall 136 of plastic material so as to increase the strength thereof, the plastic material and the metallic part of the section 128 being bonded, cemented, or otherwise integrally secured together. The lower section 132 may comprise an annular metallic ring 138 arranged around bearing block 126 and having a series of upstanding arms 140 which are embedded in a wall 142 of plastic material. The metallic and plastic parts of sections 128 and 132 may be assembled in a mold so that the metallic portions thereof will be bonded or integrally secured to the plastic parts thereof.

The bearing block 126 is provided with an upstanding axle or shaft 144 and this shaft may extend through an opening in the section 128 into a recess 129 formed therein and have connected to a threaded end thereof a nut 146 which together with the shaft 144 clamps the assembly together and assists in holding the parts of the casing in assembled relationship. A slot 148 may be formed in that part of the section 128 forming the recess and to provide a communication between the recess and the interior of the casing to permit the passage of refrigerant from the interior of the casing into the recess and thence through fitting 149, suitably secured to the section 128 and over the recess 129 to conduit 31 which is connected to fitting 149.

In the construction illustrated in this figure it will be observed that the walls of the casing opposite the motor windings 26 are formed of plastic material except for the metallic reinforcements which may be of brass.

The rotor 28 of the motor includes an elongated sleeve 40 which is journaled on the axle 144 and which sleeve 40 has integrally formed therewith or connected thereto an eccentric element 42. The eccentric element 42 is adapted to form a part of the compressor 20 and the sleeve 40 forms a direct driving connection between the motor and the compressor.

The rotor 28 may be of conventional construction and comprise a stack of circular laminations 44 suitably secured together and press-fitted or otherwise suitably secured to the sleeve 40 for rotation therewith. The rotor 28 may be provided with a plurality of axially extending passages (not shown), so as to permit the free passage of the refrigerant medium from one side thereof to the other.

The stator 30 comprises an annular spider section 50 surrounded by a ring or annular section 52. The spider section 50 comprises a stack of annular laminations made out of iron or any other suitable metallic material. Each of the laminations of the spider section 50, it will be observed, includes an annular connecting portion 58 at the inner periphery thereof and a series of radially extending arms 60 defining slots therebetween. The outer ring 52 comprising a stack of annular laminations having radially inwardly extending teeth 70 defining slots therebetween, the slots provided in the inner and outer sections 50 and 52 cooperating, as illustrated in Fig. 4, to define closed slots for accommodating the motor windings.

The spider section 50, which, in fact, is an outer section or ring, may be constructed as follows: A plurality of previously formed spider laminations may be coated with or dipped separately in a plastic or sealing material in a liquid state and then such laminations may be assembled on a suitable form or mandrel. After a sufficient number of stator laminations have been assembled on a mandrel, inserts 68, formed of plastic material, may be inserted in the slots formed by the teeth 60. The top end rings 56 may then be assembled in place and such assembly is then subjected to heat and pressure so as to cure the plastic material and to cause the same to bond together the coated laminations and the inserts 68. Such pressure as is necessary is applied to the stator ring 50 so as to insure that the laminations and the plastic thereof will be securely and integrally bonded together so as to form a gas-tight ring.

The laminations for the stator ring 50 are stamped out so as to leave approximately .032" of stock in the connecting portion 58 thereof and this .032" of stock is further reduced, in grinding, down to .025" or less. The plastic material filling the slots between the teeth 60 is of such an amount as to insure that the ring 50 is sealed or made gas-tight across the portion at the bottom of the slots and this plastic material also provides a certain amount of structural strength to the whole stator ring 50.

The outer ring 52 is formed of a stack of laminations. In manufacturing, it is practical to stamp one of each of the stator and rotor laminations out of a single piece of material. The inside of the diameter of the laminations of the outer ring 52 may be ground to fit over the outside diameter of the laminations of the inner ring 50 or the outside diameter of the laminations of the inner ring 50 may be ground to a point where the inner ring will fit tightly within the outer ring. After grinding the inside diameter of the outer ring 52, or the outside of the inner ring 50, the outer ring 52 is press-fitted over the inner ring 50 or vice versa, after the motor windings 26 have been assembled in the slots formed by the teeth 70 of the outer stator ring 52. After the inner and outer rings 50 and 52 have been thus assembled, the inside diameter of the inner ring 50 may be ground to reduce the thickness of the stock of the connecting portions 58 down to .015" or less. The object of reducing the amount of material at the inside of the slots or on the inside diameter of the inner ring 50 is for the purpose of reducing flux losses through such material. It has been found that for a ⅛ horse power motor a thickness of .025" for the connecting portion 58 does not impair or materially affect the efficiency of the motor.

The motor windings 26 may be wound upon the teeth 60 of the outer ring 52 after the same has been formed. The end rings 56 of the stator serve as locating rings to be used as a guide for the adjacent portions of the walls of the casing 22. The rings 56, in addition to being bonded to the stator laminations, also are bonded to the end surfaces of the wall sections 136 and 132 by any suitable plastic material and so as to secure a gas-tight joint capable of withstanding the pressures obtaining within the casing 22. As the motor windings 26 are arranged externally of the casing 22 and hence not exposed to the refrigerating medium and oil within the casing 22, such windings may be covered with enamel instead of the cotton covering employed when the windings are arranged inside of the casing with the result that more enamel covered wire may be employed in the windings than it was possible to use when employing a cotton covered wire thereby increasing the capacity of the motor.

After the casing 122, including the stator and motor windings are formed, the bearing block 126, the compressor and the rotor may be assembled within the casing 122 and the casing 122 welded or otherwise secured to the bearing block 126. Subsequently the nut 146 may be applied to the end of the shaft 144. A suitable thrust bearing (not shown) may be provided between the bottom end of the sleeve 40 upon which the motor rotor is carried and the bearing block which forms the bottom wall of the casing for taking the end thrust of the motor.

Examples of non-conducting materials or plastic compounds which may be used in the sealed motor construction herein set forth are glass, phenolic molding compounds and inorganic cold molded compounds. The non-conducting material in order to be satisfactory must be capable of withstanding without deformation temperatures of 250 to 300° F. and must be resistant to lubricating oil and sulphur dioxide or any other refrigerating material which might be used in the system. Reference herein to glass or a plastic compound shall include any electrical non-conducting material; that is, material which is ordinarily considered to be a non-conductor of electricity. Such material in addition to being a non-conductor of electricity, also ordinarily is non-magnetic. Without limiting the generality of the foregoing disclosure in any way specific examples of materials which are contemplated to be within the scope of the foregoing disclosure are porcelain, lead borate compounds and plastics now being marketed under the trade name of "Heresite" and "Micalex."

In the modification disclosed in Figs. 6 and 7, the motor compressor unit comprises a casing 200 enclosing the motor rotor and the compressor and providing therein a compressor compartment 202 and a motor compartment 204, the compressor compartment being a high pressure compartment while the motor compartment 204 is a relatively low pressure compartment as will be explained hereinafter. The casing 200, as illustrated, comprises a cup-shaped metallic shell 205, a frame 206, a motor stator 208 and an end plate 210. The frame 206 includes an annular skirt or flange which has a close fit within the end of the shell 205 and is secured thereto such as by welding. The frame 206 provides a seat or support for a stator 208 and the outer cap or end plate 210 has a seat or face which fits against the top of the stator 208, bolts 212 passing through aligned openings in the end plate 210 and the stator 208 and threadedly secured to tapped holes in the frame 206 being provided for clamping the stator 208 between the frame 206 and the end plate 210. The suction line 214 or the conduit which supplies refrigerant vapor to the compressor may be connected by means of a fitting to the end plate 210 and communicate with the chamber 204. The frame 206 is formed to provide a bearing for the shaft 216 which carries the motor rotor 218 and which shaft has affixed to the lower end thereof a crank or eccentric 220 which oscillates a rotor 222 within the pumping space 224 of the rotary compressor including end plates 228, the upper one of which may be integral with the frame 206 and a cylinder 230 firmly clamped between such end plates 228. The rotary compressor may be of the type previously referred to. A duct 232 formed in the bearing 206 and communicating at one end thereof with the chamber 204 and at the other end thereof with the intake side of the compressor 226 is adapted to conduct vaporous refrigerant from the chamber 204 to the compressor. The compressor discharges into the chamber 202. The chamber 202 preferably contains a quantity of lubricant to a level above the upper part of the compressor and such lubricant is under the discharge pressure of the compressor. A conduit (not shown) is adapted to conduct vaporous refrigerant from the chamber 202 to the condenser of the refrigerating system as described in connection with Fig. 1. Lubricant in the chamber 202 being under the discharge pressure of the compressor is forced through the clearances thereof and into the interior of the compressor and to the interior of the rotor 202 to lubricate and seal the compressor and to lubricate the bearings of the shaft 216. The shaft 216, it will be observed, extends between the high and low pressure chamber 202 and 204 and the bearings have a close fit with the shaft to effectively prevent the forcing of oil in any great quantity into the chamber 204. However, sufficient oil is forced upwardly along the shaft 216 due to the difference in pressures in the chamber 202 and 204 to lubricate the shaft bearings. Whatever lubricant does escape into the chamber 204 is returned through the suction conduit 232 to the intake side of the compressor and thence into the chamber 202. Normally the bottom of the eccentric slides upon the top surface of the bottom end plate 228, the weight of the rotor 218 being sufficient to hold the shaft 216 down, but under certain conditions, such as high room temperatures, the pressure within the chamber 202 may rise sufficient to lift the shaft 216 off of the bottom end plate 228.

Under these circumstances a circular plate 236 integral with the shaft 216 will be brought against a circular seat 238 formed on the bearing 216 and forming a thrust bearing and seal for the shaft 216. Preferably an oil inlet port extends between the upper part of the upper end plate 238 and the cavity within which the circular plate 236 is arranged so as to conduct lubricant under the discharge pressure into such cavity.

The construction of the stator 208 may be of identical construction to that illustrated in Fig. 4 except that the plastic inserts 68 may be omitted. The bolts 212, which may be of Bakelite and which may be four in number, may extend through the slots formed by the teeth on the inner ring of the stator. The inside diameter of the assembled stator ring, after grinding, may be provided with a coating of plastic or any of the materials previously specified. This coating may be of the order of .002" in thickness. This coating is indicated in Fig. 6 by the reference character 240. With the stator forming part of the walls of the low pressure chamber 204, which is on the suction side of the compressor, it follows that the heat and pressure to which the walls of the stator are subjected in this modification will be considerably less than that to which the walls of the stator are subjected in the modification illustrated in Figs. 1 to 5. It is to be expressly understood that the stator construction of Figs. 6 and 7, except in the respects indicated, is to be of the same construction as that illustrated in Figs. 2 to 5, inclusive.

This application is a continuation, in part, of my prior copending application Serial No. 119,567, filed January 8, 1937, patented Jan. 16, 1940, No. 2,187,033, for Electric motor and method of making the same.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. In a sealed motor, a stator including inner and outer rings arranged to provide an annular series of slots therebetween, each of said rings comprising a stack of annular laminations formed of magnetic material, motor windings arranged in said slots, said inner ring constituting an integral section of a sealed casing and said motor windings being arranged externally of said casing, a motor rotor arranged within said sealed casing, and each of those portions of said inner ring bridging said motor winding slots including a section of magnetic material of a dimension materially less than the dimension of the magnetic material between each of said slots.

2. A sealed motor having in combination a stator comprising a stack of annular laminations secured together and forming a ring, said laminations being formed of a magnetic material, motor windings arranged externally of said ring, the portions of said ring opposite said motor windings including sections of magnetic material of the order of .025 inch thick joined by radially outwardly extending portions of at least twice said thickness, means cooperating with said ring to provide in conjunction therewith a gas-tight casing, means operatively associated with said motor windings and the laminations of said ring to provide a metallic path for the magnetic field of said windings, and a rotor operatively arranged and sealed within said casing.

3. In a sealed motor, a stator comprising inner and outer rings, each of said rings comprising a stack of annular laminations formed of magnetic material, said rings being telescopically arranged relative to each other and defining complementary parts of an annular series of slots, the laminations of the inner one of said rings being bonded together by non-conducting plastic reinforcing material constituting a section of a gas-tight casing, and motor windings arranged in said slots and disposed externally of said casing.

4. A sealed motor having in combination a stator comprising a stack of annular laminations secured together and forming a ring, said laminations being formed of a magnetic material and being bonded together by non-conducting plastic reinforcing material, motor windings arranged externally of said ring, portions of said ring opposite said motor windings including a section of magnetic material of the order of .025 inch thick, means cooperating with said ring to provide in conjunction therewith a gas-tight casing, means operatively associated with said motor windings and the laminations of said ring to provide a metallic path for the magnetic field of said windings, and a rotor operatively arranged and sealed within said casing.

5. A sealed motor having in combination a stator comprising a stack of annular laminations secured together and forming a ring, said laminations being formed of a magnetic material and being bonded together by non-conducting plastic reinforcing material, motor windings arranged externally of said ring, portions of said ring opposite said motor windings including a section of magnetic material of the order of .025 inch thick, means cooperating with said ring to provide in conjunction therewith a gas-tight casing, said gas-tight casing including end sections and means for holding said end sections and said ring together, means operatively associated with said motor windings and the laminations of said ring to provide a metallic path for the magnetic field of said windings, and a rotor arranged and sealed within said casing.

EARL F. HUBACKER.